(12) United States Patent
Zawadowskiy et al.

(10) Patent No.: US 11,093,605 B2
(45) Date of Patent: Aug. 17, 2021

(54) MONITORING REAL-TIME PROCESSOR INSTRUCTION STREAM EXECUTION

(71) Applicant: Cisco Technology, Inc., San Jose, CA (US)

(72) Inventors: Andrew Zawadowskiy, Hollis, NH (US); Vincent E. Parla, North Hampton, NH (US); Alok Mittal, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 207 days.

(21) Appl. No.: 16/150,679

(22) Filed: Oct. 3, 2018

(65) Prior Publication Data

US 2020/0004954 A1 Jan. 2, 2020

Related U.S. Application Data

(60) Provisional application No. 62/691,149, filed on Jun. 28, 2018.

(51) Int. Cl.
*G06F 11/00* (2006.01)
*G06F 21/54* (2013.01)
(Continued)

(52) U.S. Cl.
CPC ............ *G06F 21/54* (2013.01); *G06F 9/3005* (2013.01); *G06F 9/30145* (2013.01);
(Continued)

(58) Field of Classification Search
CPC .... G06F 21/54; G06F 9/3005; G06F 9/30145; G06F 9/3851; G06F 21/566; G06F 21/64
(Continued)

(56) References Cited

U.S. PATENT DOCUMENTS 7,516,453 B1 * 4/2009 Bugnion ............. G06F 9/45504
718/1
9,606,941 B2 * 3/2017 Maniatis ............. G06F 12/1491
(Continued)

OTHER PUBLICATIONS

Distinguishing the unexplainable from the merely unusual: adding explanations to outliers to discover and detect significant complex rare events Ted E. Senator, Henry G. Goldberg, Alex Memory ODD '13: Proceedings of the ACM SIGKDD Workshop on Outlier Detection and DescriptionAugust 2013, pp. 40-45 (Year: 2013).*
(Continued)

*Primary Examiner* — Samson B Lemma
*Assistant Examiner* — Mohammad S Shams
(74) *Attorney, Agent, or Firm* — Edell, Shapiro & Finnan, LLC

(57) ABSTRACT

In one example embodiment, a computing device has a processor that executes a processor instruction stream that causes the processor to perform one or more operations for the computing device. The computing device generates one or more trace data packets including a first instruction pointer of the processor instruction stream, a second instruction pointer of the processor instruction stream subsequent to the first instruction pointer, and a string of characters derived from instructions associated with a control flow transfer between the first instruction pointer of the processor instruction stream and the second instruction pointer of the processor instruction stream. The computing device determines whether the one or more trace data packets are consistent with a secure processor instruction stream known or determined to be secure from malicious processor instructions and, if not, generates an indication that the processor instruction stream is not secure.

20 Claims, 5 Drawing Sheets

(51) Int. Cl.
*G06F 21/56* (2013.01)
*G06F 9/30* (2018.01)
*G06F 9/38* (2018.01)
*G06F 21/64* (2013.01)

(52) U.S. Cl.
CPC .......... *G06F 9/3851* (2013.01); *G06F 21/566* (2013.01); *G06F 21/64* (2013.01)

(58) Field of Classification Search
USPC ........................................................ 726/22
See application file for complete search history.

(56) References Cited

U.S. PATENT DOCUMENTS

| | | | | |
|---|---|---|---|---|
| 9,715,593 | B2* | 7/2017 | Daymont | G06F 11/3668 |
| 10,169,585 | B1* | 1/2019 | Pilipenko | G06F 21/566 |
| 10,565,376 | B1* | 2/2020 | Jung | G06F 12/0802 |
| 2011/0265182 | A1* | 10/2011 | Peinado | G06F 21/554 726/24 |
| 2013/0326625 | A1* | 12/2013 | Anderson | G06F 21/566 726/23 |
| 2015/0135313 | A1* | 5/2015 | Wesie | G06F 9/445 726/22 |
| 2015/0278516 | A1* | 10/2015 | Caprioli | G06F 9/30134 726/22 |
| 2016/0283714 | A1* | 9/2016 | LeMay | G06F 21/52 |
| 2017/0068816 | A1* | 3/2017 | Cavazos | G06F 21/562 |
| 2018/0004628 | A1* | 1/2018 | Strong | G06F 9/30145 |
| 2018/0107823 | A1* | 4/2018 | Samadani | G06F 9/30145 |
| 2019/0042745 | A1* | 2/2019 | Chen | G06K 9/4628 |
| 2019/0095616 | A1* | 3/2019 | Drapeau | G06F 11/3037 |
| 2019/0102338 | A1* | 4/2019 | Tang | G06F 9/3802 |
| 2019/0102550 | A1* | 4/2019 | Zhang | G06F 9/30061 |
| 2019/0347125 | A1* | 11/2019 | Sankaran | G06F 9/48 |
| 2020/0026851 | A1* | 1/2020 | Dhankha | G06F 21/566 |

OTHER PUBLICATIONS

Practical Integrated Analysis of Pointers, Dataflow and Control Flow Stefan Staiger-Stohr ACM Transactions on Programing Languages and Systems, vol. 35, Issue 1. Apr. 2013, Article No. 5, pp. 1-48 (Year: 2013).*

Shaun Waterman, "New malware works only in memory, leaves no trace", https://www.cyberscoop.com/kaspersky-fileless-malware-memory-attribution-detection/, Feb. 9, 2017, 2 pages.

Michael Dymshits, et al., Paypal, "Process Monitoring on Sequences of System Call Count Vectors", arXiv:1707.03821v1 [cs.CR], Jul. 12, 2017, 5 pages.

"Intel® 64 and IA-32 Architectures Software Developer's Manual", Volume 3C: System Programming Guide, Part 3, Order No. 326019-067US, May 2018, 326 pages.

"Intel® Architecture Instruction Set Extensions and Future Features Programming Reference", Ref. # 319433-034, May 2018, 145 pages.

James R., "Processor Tracing", https://software.intel.com/en-us/blogs/2013/09/18/processor-tracing, Sep. 18, 2013, 7 pages.

Li Chen, et al., Security and Privacy Lab, Intel Labs, "HeNet: A Deep Learning Approach on Intel Processor Trace for Effective Exploit Detection", arXiv:1801.02318v1 [cs.CR], Jan. 8, 2018, 7 pages.

* cited by examiner

```
                                    500

┌─────────────────────────────────────────────────────────────┐  510
    │  GENERATE ONE OR MORE TRACE DATA PACKETS THAT INCLUDE A     │
    │  FIRST INSTRUCTION POINTER OF THE PROCESSOR INSTRUCTION     │
    │  STREAM, A SECOND INSTRUCTION POINTER OF THE PROCESSOR      │
    │  INSTRUCTION STREAM SUBSEQUENT TO THE FIRST INSTRUCTION     │
    │  POINTER, AND A STRING OF CHARACTERS DERIVED FROM           │
    │  INSTRUCTIONS ASSOCIATED WITH A CONTROL FLOW TRANSFER       │
    │  BETWEEN THE FIRST INSTRUCTION POINTER OF THE PROCESSOR     │
    │  INSTRUCTION STREAM AND THE SECOND INSTRUCTION POINTER      │
    │  OF THE PROCESSOR INSTRUCTION STREAM                        │
    └─────────────────────────────────────────────────────────────┘
                                    │
                                    ▼
    ┌─────────────────────────────────────────────────────────────┐  520
    │  DETERMINE WHETHER THE ONE OR MORE TRACE DATA PACKETS       │
    │  ARE CONSISTENT WITH A SECURE PROCESSOR INSTRUCTION         │
    │  STREAM KNOWN OR DETERMINED TO BE SECURE FROM               │
    │  MALICIOUS PROCESSOR INSTRUCTIONS                           │
    └─────────────────────────────────────────────────────────────┘
                                    │
                                    ▼
    ┌─────────────────────────────────────────────────────────────┐  530
    │  IF IT IS DETERMINED THAT THE ONE OR MORE TRACE DATA        │
    │  PACKETS ARE NOT CONSISTENT WITH THE SECURE PROCESSOR       │
    │  INSTRUCTION STREAM, GENERATE AN INDICATION THAT THE        │
    │  PROCESSOR INSTRUCTION STREAM IS NOT SECURE                 │
    └─────────────────────────────────────────────────────────────┘
```

FIG.5

MONITORING REAL-TIME PROCESSOR INSTRUCTION STREAM EXECUTION

CROSS REFERENCE TO RELATED APPLICATION

This application claims priority to U.S. Provisional Application No. 62/691,149, filed Jun. 28, 2018, the entirety of which is incorporated herein by reference.

TECHNICAL FIELD

The present disclosure relates to malware and security vulnerability detection in a computing device.

BACKGROUND

The complexity of malware is increasing, even as malware detection methods improve. New variants of malware are focusing on ways to avoid being detected. One such variant is in-memory-only malware, which is written directly to a computer's Random Access Memory (RAM). Unlike traditional file-based malware, in-memory-only malware does not write any part of its activity on the computer's hard drive, and is therefore much more resistant to security scans of the hard drive and other methods of malware detection.

Security solutions focus on varying stages of malware attacks, from prevention to detection. Often, such solutions rely on observation of destructive behavior that indicates the presence of malware. This works well for more proactively malicious malware but is less effective for malware that simply performs data collection and other monitoring functions (e.g., spyware). Malware is becoming ever stealthier in areas such as data mining and credential collection.

In addition to malware, application vulnerabilities are also exploited to gain access to sensitive information within an enterprise. For example, one well known breach was achieved by exploiting a vulnerability in the Struts2 framework. This vulnerability was used to execute a code path that was not normally observed in the application. The resulting exploit path led to the exfiltration of customer data records.

BRIEF DESCRIPTION OF THE DRAWINGS

FIG. 5 illustrates a method for monitoring real-time processor instruction stream execution, according to an example embodiment.

DESCRIPTION OF EXAMPLE EMBODIMENTS

Overview

In one example embodiment, a computing device has a processor that executes a processor instruction stream that causes the processor to perform one or more operations for the computing device. The computing device generates one or more trace data packets including a first instruction pointer of the processor instruction stream, a second instruction pointer of the processor instruction stream subsequent to the first instruction pointer, and a string of characters derived from instructions associated with a control flow transfer between the first instruction pointer of the processor instruction stream and the second instruction pointer of the processor instruction stream. The computing device determines whether the one or more trace data packets are consistent with a secure processor instruction stream known or determined to be secure from malicious processor instructions. If it is determined that the one or more trace data packets are not consistent with the secure processor instruction stream, the computing device generates an indication that the processor instruction stream is not secure.

Example Embodiments

Figure 1:
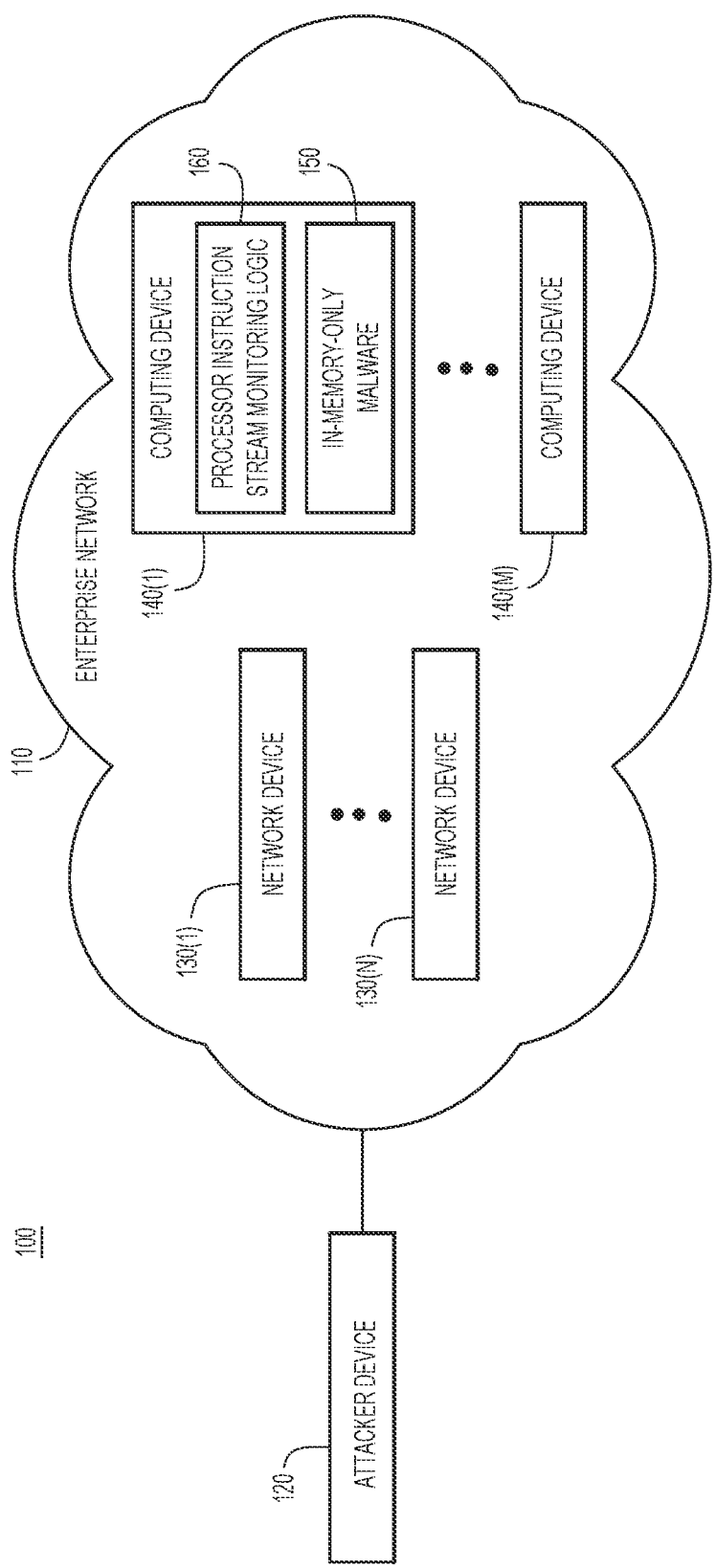
FIG. 1 illustrates a system including a computing device configured to perform operations for monitoring real-time processor instruction stream execution, according to an example embodiment.

With reference made to FIG. 1, shown is system 100 including enterprise network 110 and attacker device 120, which a bad actor is using to attempt to exploit one or more security vulnerabilities in enterprise network 110. Enterprise network 110 includes network devices 130(1)-130(N) (e.g., routers, switches, etc.) and computing devices 140(1)-140(M) (e.g., servers, mobile devices, etc.).

In this example, the bad actor may be using attacker device 120 to attempt to acquire sensitive information relating to the enterprise (e.g., confidential financial records, classified technical documents, employee data, etc.). Specifically, attacker device 120 has infected computing device 140(1) with in-memory-only malware 150. In-memory-only malware 150 is difficult to detect because it exists only in the Random Access Memory (RAM) of computing device 140(1). Moreover, in-memory-only malware 150 is spyware and therefore produces no overt indication of its existence on computing device 140(1). It will be appreciated that in-memory-only malware 150 is just one example, and that a bad actor can use any attack/exploit vector.

Accordingly, embodiments are presented herein to leverage processor (e.g., Central Processing Unit (CPU)) functionality to detect the code that is actually executing on a computing device/system. This is the ground truth as to what activities are occurring within the computing device/system that may be caused by malware (or any activity resulting from a security vulnerability). For instance, in the example of FIG. 1, computing device 140(1) may trace the execution of instructions by its processor in order to monitor the code that is actually executed by computing device 140(1). Tracing processor execution enables, for example, the detection of in-memory-only malware 150.

State-of-the-art processors cannot trace processor instruction stream execution for security purposes. For illustrative purposes, the processor trace functionality of an Intel® processor is described, but only by way of example. Briefly, an Intel processor uses Instruction Pointers (IPs) to indicate where a computing device is in a program sequence. Whenever the processor executes a new instruction in the program sequence, the IP changes to correspond to a memory address of that new instruction. As used herein, the term Source IP (SIP) may refer to an IP from which a CALL/SYSCALL or other control flow transfer is performed, and the term Target IP (TIP) may refer to an IP to which a CALL/SYSCALL or other control flow is being transferred. The SIP may be the previous TIP; that is, the previous TIP becomes the SIP when the processor executes a new instruction. Currently, Intel processors do not record the SIP.

Moreover, program sequences executed by a processor are not necessarily strictly linear, and may cause the processor to navigate a branch of the program. For example, the program may cause the processor to perform action A if a condition is present, or else cause the processor to perform action B. Overall modern programs may be viewed as a collection of linear sections of instructions chained together with flow control instructions.

An Intel processor can generate various trace data packets to describe processor instruction stream execution, including TIP packets and Taken Not Taken (TNT) packets. A TIP packet is generated when the processor transfers the current IP (e.g., TIP) to a new IP (e.g., TIP) as a result of JMP/CALL/SYSCALL and their function variations. A TNT packet provides taken/not-taken results for executed conditional branches, Jump condition code (Jcc), etc. Using TIP and TNT packets, a trace of the instruction flow for the processor can be built. Instructions that the processor actually executed can be extracted from the binary code of the executed program and mapped to the TIP/TNT packets.

A decoded example of an executed processor instruction stream is provided as follows. In this example, a TNT value of "1" indicates that an "if" action was taken, and a TNT value of "0" indicates that an "else" action was taken.
TNT 1111111011101
TIP 0000000000400786
TNT 1111111110
TIP 00000000004006f1
TNT 11
TIP 0000000000400797
TNT 0
TIP 00000000004007f3

Conventional tracing mechanisms such as TIP and TNT packets alone cannot detect in-memory-only malware 150. Even though TNT packets provide an indication of the overall flow of the executed processor instruction stream, the in-memory-only malware 150 can, when executed, maintain the overall number of control flows and their values (e.g., TNT and TIP) at the same count to evade detection. In other words, because of the way the bad actor designed in-memory-only malware 150, computing device 140(1) may produce the same TNT and TIP packets regardless of whether in-memory-only malware 150 is executed. For example, in-memory-only malware 150 can be made to follow same if/else logic as non-malicious code while performing totally different computations, thereby producing the same TNT packets as the non-malicious code.

Another limitation of current processor trace functionality for use as a security mechanism is that it assumes that the user/developer of the trace has access to the executed program binary code on the disk. This is not the case when in-memory-only malware or self-modifying code is introduced, which makes it very difficult to accurately determine the SIP in most cases.

Moreover, other conventional approaches such as SYSCALL monitoring have been proposed to try to detect application behaviors and malware. Despite the years of extensive research, these approaches have never produced a practical outcome. SYSCALL output varies significantly from run-to-run of a compiled program. Additionally, the SYSCALL approach cannot represent the execution of the entire processor instruction stream. An adversary can easily bypass, alter or mask execution observed by a SYSCALL monitor.

Accordingly, computing device 140(1) includes processor instruction stream monitoring logic 160 and/or processor functionality for monitoring processor security in real-time. These techniques may enable detection of in-memory-only malware 150 based on real-time processor instruction stream execution at computing device 140(1). Briefly, computing device 140(1) has a processor that executes a processor instruction stream that causes the processor to perform one or more operations for computing device 140(1). In order to monitor processor security, computing device 140(1) generates one or more trace data packets in accordance with techniques described herein. The trace data packets include a first instruction pointer of the processor instruction stream (e.g., a SIP), a second instruction pointer of the processor instruction stream subsequent to the first instruction pointer (e.g., a TIP), and a string (or sequence) of characters derived from instructions associated with a control flow transfer between the first instruction pointer of the processor instruction stream (SIP) and the second instruction pointer of the processor instruction stream (TIP). The string of characters may be derived from instructions between the first instruction pointer and up to and including the control flow instruction that is about to transfer to the second instruction pointer. The second instruction pointer may be a target of the control flow instructions which terminates the current linear instructions stream. In one example, the string of characters may be derived from instructions executed from the SIP up to and including instructions for upcoming transfer (e.g., CALL, JMP, etc.).

Computing device 140(1) may generate the string of characters by performing a deterministic mathematical computation on the instructions associated with the control flow transfer between the first instruction pointer of the processor instruction stream (SIP) and the second instruction pointer of the processor instruction stream (TIP). A mathematical computation may be deterministic if it consistently produces the same output (e.g., string of characters) for a given input (e.g., instructions associated with a control flow transfer). The deterministic mathematical computation may be, for instance, a hash computation (e.g., a cryptographic hash computation) or a checksum computation, and the string of characters may be any suitable string, such as a cryptographic hash string or a checksum string. The string of characters may be a numeric string (1's and 0's or 0-9) or an alphanumeric string that includes numbers and alphabet characters (or any other characters). The string of characters may be machine-readable or human-readable, and may include characters in English or any other language. In one example, the string of characters is a sequence/array of bytes. The string of characters may include non-printable characters (e.g., null, start of heading, etc.) and/or printable characters (e.g., a, A, 0, 1, 2, !, etc.).

A cryptographic hash may be computed on the instructions executed from the previous TIP up to and including the SIP in the current IP packet. Different cryptographic hash families may be used, such as the less secure MD5 (due to its smaller hash size) or the more secure SHA256 (due to its larger hash size). Other hashing techniques, such as dynamic space efficient hashing, may also be used, so long as some sort of hash is generated. The overall strength of the hash may contribute to the strength of embodiments described herein. Depending on the particular use case, a compromise may be made between the strength of the hash and computing performance or power usage, for example. The hashes that are generated for prior execution stream(s) may be retained in a cache. The trace data packet has high integrity because the string of characters (e.g., hash) represents the instructions that were actually executed, and may be unique (or effectively unique) for a given processor instruction stream execution path.

Generating a trace data packet that includes the SIP, TIP, and associated string of characters enables computing device 140(1) to monitor processor stream instruction execution without accessing the binary code. For example, computing device 140(1) may determine whether the one or more trace data packets are consistent with a secure processor instruction stream known or determined to be secure from malicious processor instructions (e.g., secure from in-memory-only malware 150). If it is determined that the one or more trace data packets are not consistent with a secure processor instruction stream, computing device 140(1) may generate an indication (e.g., alert, log, etc.) that the processor instruction stream is not secure (e.g., that the processor instruction stream has been impacted by in-memory-only malware 150).

Computing device 140(1) may compare the SIP in the trace data packet to a corresponding (e.g., previously recorded) SIP of the secure processor stream, the TIP in the trace data packet to a corresponding (e.g., previously recorded) TIP of the secure processor stream, and/or the string of characters in the trace data packet to a (e.g., previously recorded) string of characters derived from instructions associated with a corresponding control flow transfer between the corresponding SIP and TIP of the secure processor instruction stream. If there is a mismatch with one or more of these comparisons, this may indicate that computing device 140(1) is infected with in-memory-only malware 150.

Program modification by malware (e.g., in-memory-only malware 150) can involve (1) modifications of sequential code but not modifications to control flow, and/or (2) modifications to control flow and sequential code. The first type of modifications invalidate the string of characters of code instructions when executed, and produces an entirely different string of characters. As such, this new string of characters may be detected as being different from the previously observed (reference) string of characters. When the second type of modifications are made, both the string of characters and SIP/TIP change and, as such, may also be detected according to the techniques presented herein.

An example of a traced execution path is provided as follows. This is the same example as above, but now includes the SIP and string of characters. In this example, the string of characters results from a cryptographic hash computation.
TNT 1111111011101
SIP: 0000000000400470; TIP: 0000000000400786; hash: be33bbae89dc47d23887cc05c47ebe01
TNT 1111111110
SIP: 00000000004004f1; TIP: 00000000004006f1; hash: 2d8519eaeb9a35b7d0f6e4a9fdddad5d
TNT 11
SIP: 0000000000400497; TIP: 0000000000400797; hash: 6512bd43d9caa6e02c990b0a82652dca
TNT 0
SIP: 00000000004003f3; TIP: 00000000004007f3; hash: cfcd208495d565ef66e7dff9f98764da This execution flow may also be complemented using existing TNT packets to detect the processor instruction stream execution path in the case of, for example, hash mismatch or where a new SIP/TIP is discovered. This security processor trace capability may be used to build a history of processor instruction stream execution and compare at run time to detect program deviations as a result of new code injections or other modifications of expected code.

Provided below is example pseudocode representative of the process to generate a string of characters and compare operations in computing device 140(1). The "if" command causes a hash computation to be continued, and the "else" command causes the next hash in the program sequence to be calculated.

```
CurrentIP = ProgramStartAddress;
CurrentHash = 0;
LastIP = 0;
while (CurrentInstCode = getNextInst( ))
    update CurrentHash with CurrentInstCode;
    if (CurrentInstCode IS NOT ControlFlowInstructions)
        continue;
    else
        SourceIP = LastIP;
        TargetIP = getNextIPAddress( );
        SendPacket(SourceIP, TargetIP, CurrentHash);
        LastIP = TargetIP;
        CurrentHash = 0;
    CurrentIP = getNextIPAddress( );
```

Certain program sequences may involve one or more loops in which a processor repeatedly executes a given processor instruction. In this case, computing device 140(1) may record identical [SIP, TIP, string of characters] triplets repeatedly until the processor exits the loop. However, in order to reduce memory consumption, computing device 140(1) may record the [SIP, TIP, string of characters] triplets once, and then increment a counter every time that triplet has been observed. Computing device 140(1) may thereby compare a count of occurrences of a given control flow transfer (as represented by a string of characters) in a real-time processor instruction stream to a count of occurrences of a corresponding control flow transfer (as represented by a string of characters) in the secure processor instruction stream. For example, if a loop in the secure processor instruction stream repeated one-hundred times, but is now repeated one-billion times, this may indicate that the processor instruction stream has been compromised.

In one example, computing device 140(1) may identify a plurality of instruction pointers in the secure processor instruction stream and control flow transfers between instruction points in the secure processor instruction stream as the secure processor instruction stream is executed. This may occur before the execution of the test processor instruction stream in order to allow computing device 140(1) to compare the test processor instruction stream to the secure processor instruction stream. For example, computing device 140(1) may generate string of characters respectively derived from instructions associated with control flow transfers between SIPs and TIPs of the secure processor instruction stream.

In accordance with one embodiment, computing device 140(1) may maintain data characterizing the secure processor instruction stream in any suitable data structure (e.g., hash table, linked list, graph, etc.) in order to build a Finite State Machine (FSM). Computing device 140(1) may use the FSM to monitor processor instruction stream execution for purposes of detecting new/unseen processor instruction stream execution paths as well as enabling application and malware behavioral clustering. For example, computing device 140(1) may build an FSM for malware sandboxed execution to enable the detection of similar malware families (clustering). Alternatively, computing device 140(1) may use the FSM to build behavioral patterns that represent the normal operation of a "good" (e.g., uninfected) application. Unexpected processor instruction stream execution paths may be detected by comparing the FSM to real-time processor instruction stream execution paths and monitoring for unknown transitions and states.

Figure 2:
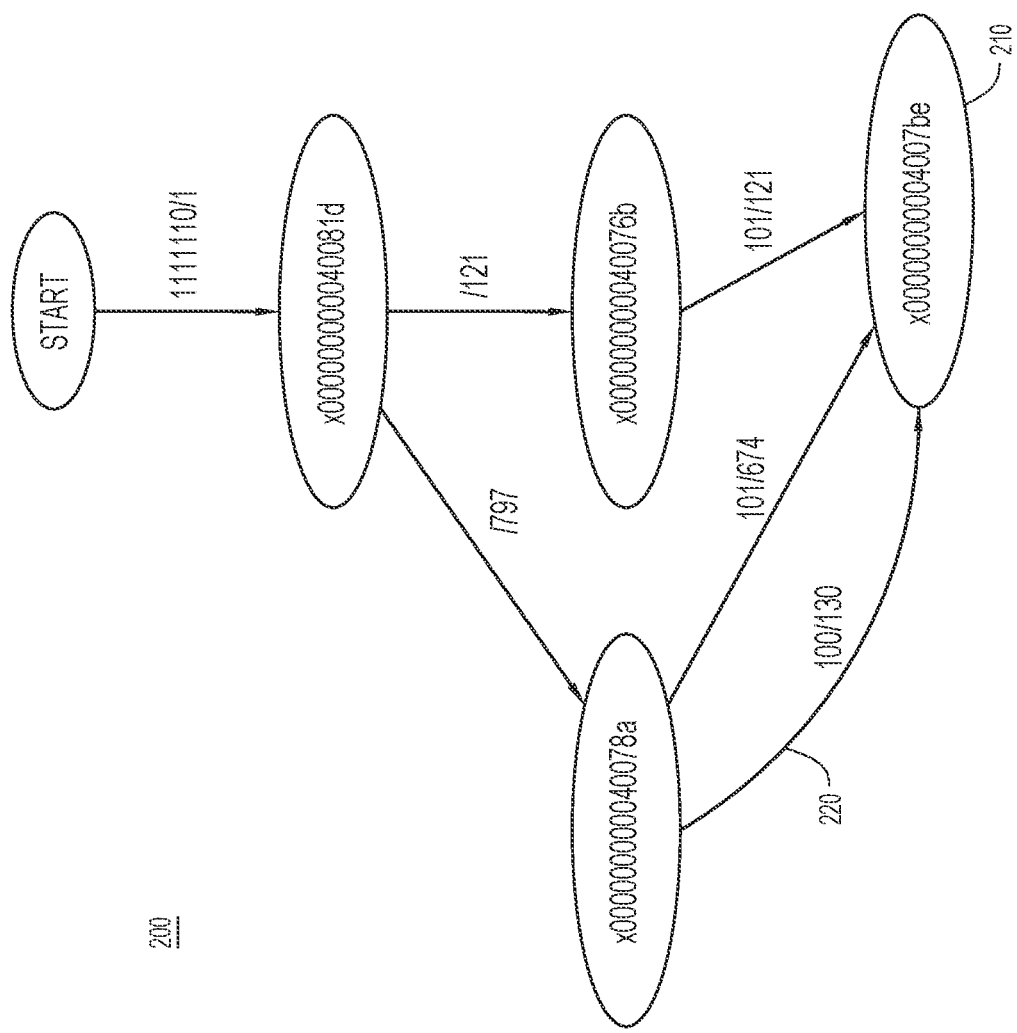
FIG. 2 illustrates a directed graph of a finite state machine for monitoring real-time processor instruction stream execution using taken/not taken results from the processor instruction stream, according to an example embodiment.

In one example, computing device 140(1) may generate a logical representation of a directed graph to build the FSM for the secure processor instruction stream. FIG. 2 illustrates an example directed graph 200 built from TNT and TIP data obtained from a program sequence. Directed graph 200 includes a plurality of nodes and edges. For ease of illustration, only node 210 and edge 220 are labeled, although it will be appreciated that directed graph 200 includes nodes and edges other than those specifically labeled. Directed graph 200 was built using processor instruction stream execution trace of a short demonstration application. Tracing was collected only for user mode code (kernel code is excluded for ease of illustration). It will be appreciated that techniques presented herein are compatible with more complex directed graphs having a greater number of nodes and/or edges.

Each node in directed graph 200 represents a TIP, and each edge represents a transition to a TIP. Each transition includes a TNT string corresponding to instructions associated with respective control flow transfers to a TIP. In one example, node 210 is a TIP, and edge 220 represents a transition to node 210. Here, the TNT string is 100 and the TIP is 00000000004007be. Computing device 140(1) also maintains a count of occurrences of for the respective control flow transfers. These are shown following the slashes after the TNT strings. The count corresponding to edge 220, for example, is 130, meaning that edge 220 was executed 130 times. Once computing device 140(1) has generated directed graph 200, computing device 140(1) may use directed graph 200 to compare a real-time processor instruction stream execution against the secure processor instruction stream (as represented by directed graph 200) to determine whether the real-time processor instruction stream execution is secure.

Figure 3:
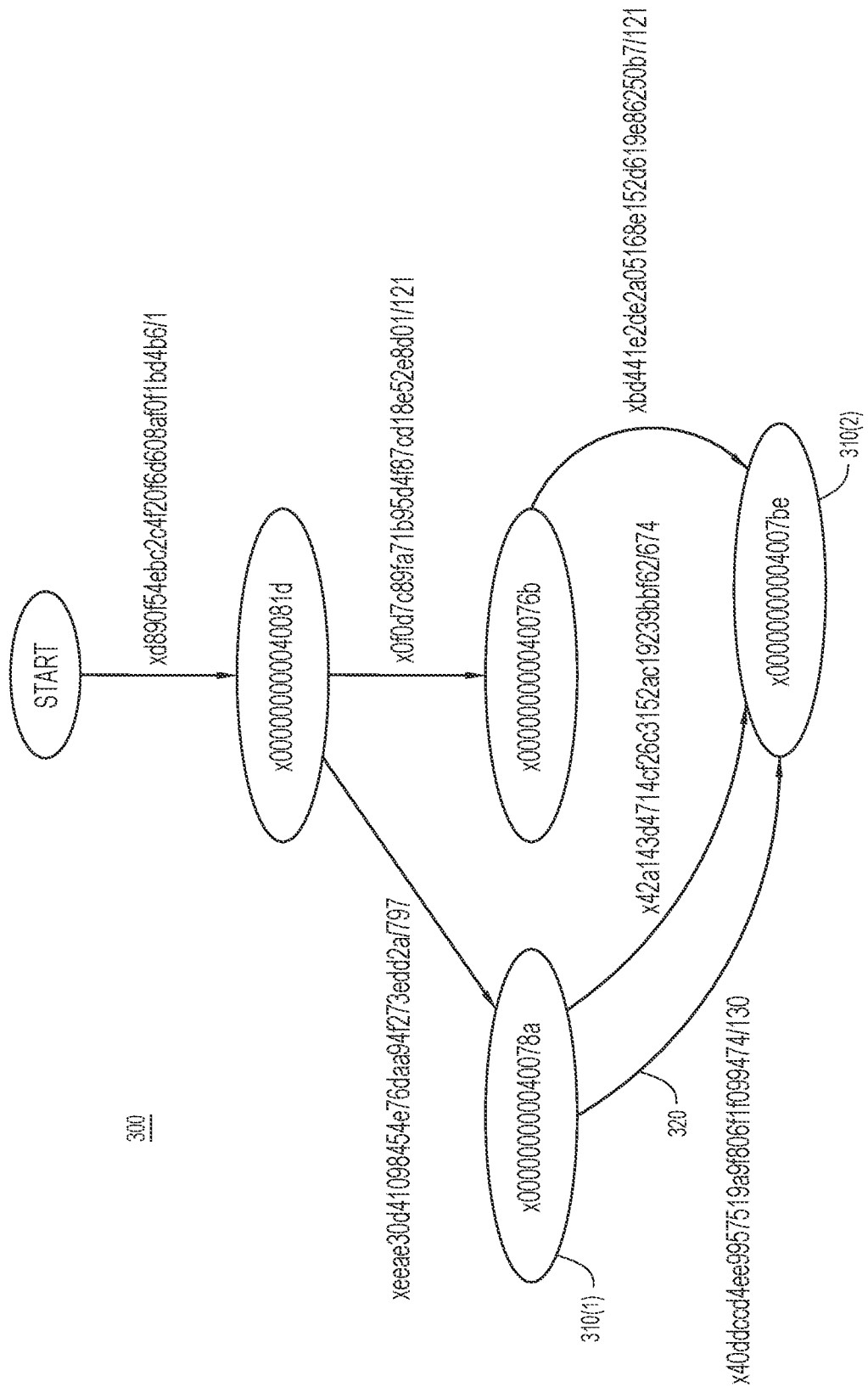
FIG. 3 illustrates a directed graph of a finite state machine for monitoring real-time processor instruction stream execution using strings of characters derived from executed code from the processor instruction stream, according to an example embodiment.

FIG. 3 illustrates another directed graph 300 obtained from the same program sequence as directed graph 200. Directed graph 300 may be more secure than directed graph 200 because directed graph 300 includes unique string of characters (here, MD5 hashes) corresponding to instructions associated with (e.g., executed between) respective control flow transfers between a SIP and a TIP. Each node in directed graph 300 represents an IP (SIP or TIP), and each edge represents a transition between a SIP and a TIP. Unlike the transitions in directed graph 200, which use TNT strings, each transition in directed graph 300 includes a string of characters derived from instructions associated with a respective control flow transfer between the SIP and TIP of the secure processor instruction stream.

For ease of illustration, only nodes 310(1) and 310(2) and edge 320 are labeled, although it will be appreciated that directed graph 300 includes nodes and edges other than those specifically labeled. In one example, node 310(1) is a SIP, node 310(2) is a TIP, and edge 320 represents a transition from node 310(1) to node 310(2). Here, the SIP is 000000000040078a and the hash is 40ddccd4ee9957519a91806f1f099474. Like the example of FIG. 2, the TIP is 00000000004007be and the count corresponding to edge 320 is 130, meaning that edge (or transition) 320 was executed 130 times.

Thus, computing device 140(1) may generate a logical representation of a directed graph (e.g., directed graph 300) including a plurality of nodes and a plurality of edges. The plurality of nodes may respectively represent a plurality of instruction pointers in the secure processor instruction stream, and the plurality of edges may respectively represent a plurality of transitions between the plurality of nodes. Each of the plurality of transitions may include a string of characters derived from instructions associated with a respective control flow transfer between instruction pointers of the secure processor instruction stream. Once computing device 140(1) has generated directed graph 300, computing device 140(1) may use directed graph 300 to compare a real-time processor instruction stream execution against the secure processor instruction stream (as represented by directed graph 300) to verify that the real-time processor instruction stream execution is secure (e.g., from in-memory-only malware 150).

Computing device 140(1) may store data descriptive of a directed graph (e.g., directed graph 300), for example in permanent storage of computing device 140(1). For real-time use, computing device 140(1) may upload data that is descriptive of the directed graph into processor instruction stream monitoring logic 160. Processor instruction stream monitoring logic 160 reads processor instruction stream data (e.g., [SIP, TIP, string of characters] triplets), one trace data packet at a time. Processor instruction stream monitoring logic 160 determines whether the current state of the directed graph (i.e., the node) matches the SIP. In the event of a mismatch, an alarm may be triggered.

Moreover, if the SIP matches the current state, the string of characters (e.g., hash) may be used to determine whether there is an edge with that same string of characters. If there is no edge with that string of characters, an alarm may be triggered as this is indicative of a new processor instruction stream execution path. If a transition edge has been found that matches the string of characters, then a known processor instruction stream path was executed. Finally, processor instruction stream based security logic 160 may determine whether the TIP matches the corresponding state. If the SIP and string of characters match, so should the TIP. Otherwise, an alarm may be triggered.

The following example pseudocode is representative of a process for building a directed graph.

```
currentSTH = null; // pointer to current trace data packet including members sip -source ip
address, dip -destination ip, h hash;
currentFSM = null; // current state machine
while (currentSTH = getNextSTH( ))
    sip = findStateNode(currentFSM, currentSTH.sip)
    if (sip == null) // not found, just add
        sip = addNewNode(currentFSM, currentSTH.sip)
    tip = findStateNode(currentFSM, sip, currentSTH.tip)
    if (tip == null) // not found, just add
        tip = addNewNode(currentFSM, currentSTH.tip)
    transition = findStateTransition(currentFSM, sip, tip, currentSTH.hash)
```

```
if (transition = null) // add new transition from SIP node to TIP node on the graph
    transition = addNewTransition(currentFSM, sip, tip, hash)
```

The following example pseudocode is representative of process for using a directed graph to monitor an ongoing processor execution stream produced by a processor to detect an anomaly.

```
stopOnMismatch = true // depends on configuration
currentFSM = loadFSM(appname); // for application to be monitored
currentState = 0; // start state
while (currentSTH = getNextSTH( ))
    // see if current FSM has state
    sip = findStateNode(currentFSM, currentSTH.sip)
    if (sip == null) // not found, log alarm
        log("Alarm: invalid source state found for transition")
        if (stopOnMismatch)
            break
    if (currentSatte != sip)
        log("Alarm: Reported source address is not matching with current State.")
        if (stopOnMismatch)
            break
    // see if current FSM has state which could be a target
    tip = findStateNode(currentFSM, sip, currentSTH.tip)
    if (tip == null) // not found, log alarm
        log("Alarm: invalid target state found for transition")
        if (stopOnMismatch)
            break
    // see if there is transition from SIP state to TIP state which is equals currentSTH.hash
    transition = findStateTransition(currentFSM, sip, tip, currentSTH.hash)
    if (transition == null)
        log("Alarm: invalid transition found ")
        if (stopOnMismatch)
            break
    currentState = tip; // if all transitions are valid, proceed to new state; if not, some strange state
has been arrived at which will now be current
```

There may be challenges associated with dynamic loading of libraries or relocatable binaries/compiled binary files (e.g., those produced for compiled C/C++ programs). For example, a program sequence may be executed twice, each at a different time. In this case, the program sequence may be loaded at two different addresses, as shown as follows:
SIP: 00000000004006f1; TIP: 00000000004009f1; hash: 2d8519eaeb9a35b7d0f6e4a9fdddad5d
SIP: 00000000006006f1; TIP: 00000000006009f1; hash: 2d8519eaeb9a35b7d0f6e4a9fdddad5d In the first program sequence, the program loads at address 0x400000. In the second program sequence, the program loads at 0x600000. The issue raised by this situation is how the processor can compare the first and second program sequence (e.g., if the first program sequence is the secure processor instruction stream and the second program sequence is the real-time/test processor instruction stream).

This problem may be solved with address normalization techniques, using a relative address approach. Specifically, a normalization may be performed for all addresses as relative to module load address, and the module load address may then be subtracted as follows:

[normalized address]=[absolute address]−[module load address]

Or in this example:

*0x6f1=0x4006f1−0x400000*

*0x6f1=0x6006f1−0x600000*

This may produce the same [SIP, TIP, string of characters] triplet for both program sequences after normalization with an unchanged hash value:

SIP: 00000000000006f1; TIP: 00000000000009f1; hash: 2d8519eaeb9a35b7d0f6e4a9fdddad5d To perform such normalization at run time, processor instruction stream monitoring logic 160 may use load addresses, which may be easily accessible. To help illustrate this concept, an example program in C code is provided below.

```
int
main(int ac, char **av)
{
    pf_foo_t pf_foo1 = foo1;
    pf_bar_t pf_bar1 = bar1;
    uint64_t loop_count = 10;
    uint64_t total=0;
    for (uint64_t i=0; i < loop_count; i++) {
        uint64_t t = pf_foo1(pf_bar1, i);
        total += t;
        t = foo1(bar1, i);
        total += t;
    }
    return total > 234567 ? 1 : 0;
}
static uint64_t
foo1(pf_bar_t pf_bar, const uint64_t i)
{
    if ((i & 1)!=0) {
        uint64_t t = pf_bar(sleep);
        return t;
    }
    uint64_t t = bar1(sleep);
    return t;
}
static uint64_t
```

```
bar1(pf_sleep_t pf_sleep)
{
  uint64_t i;
  pf_sleep(1);
  for (i=0; i < 10; i++ )
    ;
  sleep(1);
  return i;
}
```

The program above was compiled in such a way (using the fPIC gcc option) to make it possible to load the program and its dependency at different load addresses. A portion of the dump of assembler code (assembly metadata (asm) dump) for this program is reproduced below.

Dump of assembler code for main function:

```
0x00000000004005a3 <+141>:  48 81 7d d0 47 94 03 00   cmpq    $0x39447,-0x30(%rbp)
0x00000000004005ab <+149>:  0f 97 c0                  seta    %al
0x00000000004005ae <+152>:  0f b6 c0                  movzbl  %al,%eax
0x00000000004005b1 <+155>:  c9                        leaveq
0x00000000004005b2 <+156>:  c3                        retq
End of assembler dump.
```

Dump of assembler code for function fool:

```
0x00000000004005b3 <+0>:   55                        push   %rbp
0x00000000004005b4 <+1>:   48 89 e5                  mov    %rsp,%rbp
0x00000000004005b7 <+4>:   48 83 ec 20               sub    $0x20,%rsp
0x00000000004005bb <+8>:   48 89 7d e8               mov    %rdi,-0x18(%rbp)
0x00000000004005bf <+12>:  48 89 75 e0               mov    %rsi,-0x20(%rbp)
0x00000000004005c3 <+16>:  48 8b 45 e0               mov    -0x20(%rbp),%rax
0x00000000004005c7 <+20>:  83 e0 01                  and    $0x1,%eax
0x00000000004005ca <+23>:  48 85 c0                  test   %rax,%rax
0x00000000004005cd <+26>:  74 1a                     je     0x4005e9 <fool+54> <-direct jump, relative address
0x00000000004005cf <+28>:  48 8b 45 e8               mov    -0x18(%rbp),%rax
0x00000000004005d3 <+32>:  48 8b 15 1e 0a 20 00      mov    0x200a1e(%rip),%rdx  #0x600ff8
0x00000000004005da <+39>:  48 89 d7                  mov    %rdx,%rdi
0x00000000004005dd <+42>:  ff d0                     callq  *%rax  <- indirect call
0x00000000004005df <+44>:  48 89 45 f0               mov    %rax,-0x10(%rbp)
0x00000000004005e3 <+48>:  48 8b 45 f0               mov    -0x10(%rbp),%rax
0x00000000004005e7 <+52>:  eb 17                     jmp    0x400600 <fool+77> <-direct jump, relative address
0x00000000004005e9 <+54>:  48 8b 05 08 0a 20 00      mov    0x200a08(%rip),%rax  #0x600ff8
0x00000000004005f0 <+61>:  48 89 c7                  mov    %rax,%rdi
0x00000000004005f3 <+64>:  e8 59 00 00 00            callq  0x400651 <bar1>  <- indirect call
0x00000000004005f8 <+69>:  48 89 45 f8               mov    %rax,-0x8(%rbp)
0x00000000004005fc <+73>:  48 8b 45 f8               mov    -0x8(%rbp),%rax
0x0000000000400600 <+77>:  c9                        leaveq
0x0000000000400601 <+78>:  c3                        retq
End of assembler dump.
```

Dump of assembler code for function bar1:

```
0x0000000000400651 <+0>:   55                           push   %rbp
0x0000000000400652 <+1>:   48 89 e5                     mov    %rsp,%rbp
0x0000000000400655 <+4>:   48 83 ec 20                  sub    $0x20,%rsp
0x0000000000400659 <+8>:   48 89 7d e8                  mov    %rdi,-0x18(%rbp)
0x000000000040065d <+12>:  48 8b 45 e8                  mov    -0x18(%rbp),%rax
0x0000000000400661 <+16>:  bf 01 00 00 00               mov    $0x1,%edi
0x0000000000400666 <+21>:  ff d0                        callq  *%rax
0x0000000000400668 <+23>:  48 c7 45 f8 00 00 00 00      movq   $0x0,-0x8(%rbp)
0x0000000000400670 <+31>:  eb 05                        jmp    0x400677 <bar1+38> <- direct jump, relative address
0x0000000000400672 <+33>:  48 83 45 f8 01               addq   $0x1,-0x8(%rbp)
0x0000000000400677 <+38>:  48 83 7d f8 09               cmpq   $0x9,-0x8(%rbp)
0x000000000040067c <+43>:  76 f4                        jbe    0x400672 <bar1+33> <- direct jump, relative address
0x000000000040067e <+45>:  bf 01 00 00 00               mov    $0x1,%edi
0x0000000000400683 <+50>:  e8 90 fd ff ff               callq  0x400418
```

```
0x0000000000400688 <+55>: 48 8b 45 f8      mov     -0x8(%rbp),%rax
0x000000000040068c <+59>: c9               leaveq
0x000000000040068d <+60>: c3               retq
End of assembler dump.
```

This example illustrates that control flow instructions addresses are not included in absolute form. This enables Position Independent Code (PIC) as well as Address Space Layout Randomization (ASLR), which is a technology used to help mitigate shellcode attacks.

The processor is not expected to perform a "reverse relocation" computation, and only includes a linear address for the SIP address in trace data packets. When control flow instruction occurs (e.g., CALL, SYSCALL, etc.), the trace data packet is generated, and includes a linear address for the SIP and TIP. This packet may stream to monitor microcode. Code may also/alternatively run outside of the processor with more overhead, meaning that this can be a completely software-based solution, if desired.

The processor functionality and/or processor instruction stream monitoring logic 160 may use the module load address and module size to normalize addresses. Given linear addresses from the trace data packets and module load information, the processor functionality and/or processor instruction stream monitoring logic 160 may perform address normalization. Normalized addresses may be compared with learned normalized addresses, e.g., on directed graphs 200 and/or 300.

At a high level, there are two distinct types of control flow transfers: direct transfer and indirect transfer. Examples of direct transfers include conditional branches and unconditional direct branches, and examples of indirect transfers include near/far calls and near jumps. Direct transfers are relative branches and only a relative address is included as part of the transfer instruction. Considering 72 b2 jb from the example program above, b2 is the relative portion and is unaffected by ASLR. Indirect transfers, on other hand, enable ASLR, and also simplify the problem for hashing of a processor instruction stream by not including addresses therein. Instead, transfer addresses come from a register, which is often loaded with Load Effective Address (LEA) instructions.

As such, challenges associated with dynamic loading of libraries or relocatable binaries/compiled binary files may be overcome using address normalization techniques.

Figure 4:
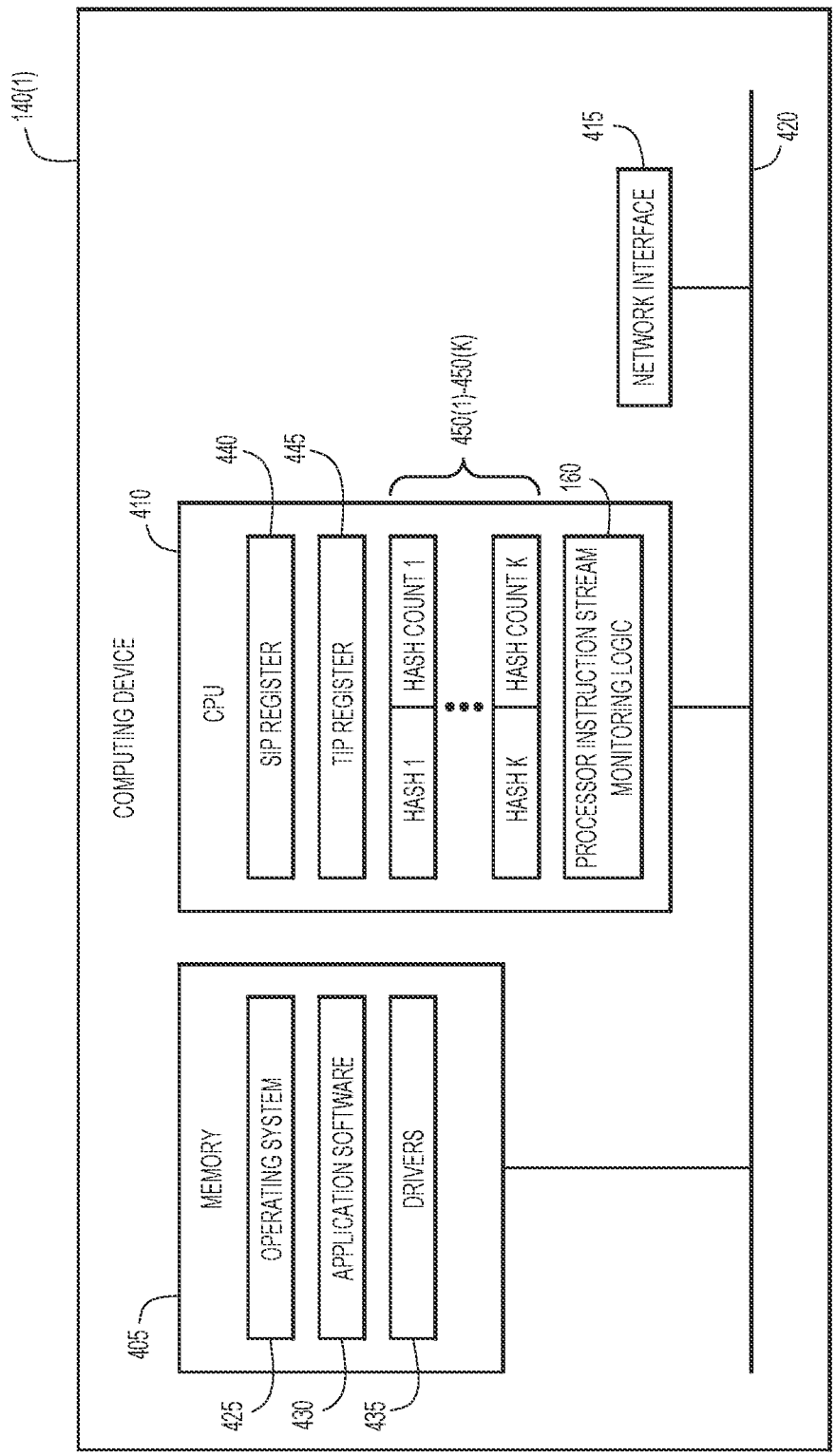
FIG. 4 is a block diagram of a computing device configured to perform operations for monitoring real-time processor instruction stream execution, according to an example embodiment.

FIG. 4 is a simplified block diagram of computing device 140(1) configured to perform techniques presented herein. Computing device 140(1) includes memory 405, CPU 410, network interface 415, and bus 420 to connect memory 405, CPU 410, and network interface 415. There may also be other components in computing device 140(1), depending on its particular intended use. It will be appreciated that this simplified block diagram of computing device 140(1) is merely an example, and that other configurations may be employed.

Memory 405 stores instructions for an operating system 425, application software 430, and drivers 435. Memory 405 may be read only memory (ROM), random access memory (RAM), magnetic disk storage media devices, optical storage media devices, flash memory devices, flash disk, permanent storage, electrical, optical, or other physical/tangible memory storage devices. Thus, in general, the memory 405 may be one or more tangible (non-transitory) computer readable storage media (e.g., a memory device) encoded with software comprising computer executable instructions and when the software is executed (by CPU 410) it is operable to perform the operations described herein.

CPU 410 includes processor instruction stream monitoring logic 160, SIP register 440, TIP register 445, and plurality of hash/count memory locations or registers 450(1)-450(K). In one example, when CPU 410 executes processor instruction stream monitoring logic 160, computing device 140(1) builds a directed graph (e.g., directed graph 300) for purposes of detecting a new code path executed by a monitored application, as a way to find similarities between application code sections, for example malware families, and for authoritative learning for application behavioral monitoring. CPU 410 may include one or more tangible (non-transitory) computer readable storage media which store processor instruction stream monitoring logic 160. CPU 410 may also be configured to execute instructions stored in memory 405. In some embodiments, all or a portion of processor instruction stream monitoring logic 160 may be stored in memory 405.

Network interface 415 is a network interface card (or multiple instances of such a device) or other network interface device that enables network communications on behalf of the computing device 140(1) for sending and receiving messages.

FIG. 5 is a flowchart of a method 500 for monitoring processor security based on real-time processor instruction stream execution. Method 500 may be performed at a computing device (e.g., computing device 140(1)) having a processor (e.g., CPU 410) that executes a processor instruction stream that causes the processor to perform one or more operations for the computing device. At 510, the computing device generates one or more trace data packets. The trace data packet(s) include a first instruction pointer of the processor instruction stream, a second instruction pointer of the processor instruction stream subsequent to the first instruction pointer, and a string of characters derived from instructions associated with a control flow transfer between the first instruction pointer of the processor instruction stream and the second instruction pointer of the processor instruction stream.

At 520, the computing device determines whether the one or more trace data packets are consistent with a secure processor instruction stream known or determined to be secure from malicious processor instructions. At 530, if it is determined that the one or more trace data packets are not consistent with the secure processor instruction stream, the computing device generates an indication that the processor instruction stream is not secure (e.g., has been altered).

Presented herein are techniques to extend processor trace mechanisms with security focused functionality and useful processor telemetry types (e.g., the [SIP, TIP, string of characters] triplet). These techniques provide a cryptographically strong guarantee to monitor the instruction stream that was actually executed. Information produced by such extended processor trace functionality may be used in different ways to detect new code execution or code modifications for "good" applications. Since the processor may write mismatched data to configured memory and raise an interrupt/alert/etc. asynchronously to the execution of code, functionality may be used as a real-time security monitoring feature running in an "Intrusion Detection System (IDS)" mode, as monitored software application(s) are executing in real-time. This may include running on sandboxes, for example, to produce additional context. One or more software implementations of such execution trace monitors may run for either use case.

This functionality may be configured at least in part on a processor (e.g., through use of Model Specific Registers (MSRs). This may specify which control flow instructions to include and the memory addresses to write the trace data packets. In one example, the executed application cannot turn on/off this functionality. This technology may be enabled with minimal slowdown in program execution and without changing or injecting code into the application. In a further example, a user mode application may not detect that it is actually being traced/monitored.

The solution presented herein may continuously trace the execution of the entire machine (e.g., both user mode and kernel mode as seen by the processor). Even a single Return-Oriented Programming (ROP) transfer may be determined to be an invalid transition as one or more elements of the aforementioned triplet may differ from known transitions. Thus, the solution may detect the ROP attack vector.

As described herein, a processor may provide a cryptographic hash of executed code chunks (an instruction stream) in the form of processor trace data packets. A chunk may be identified as the program sequence from the last call address to next call address. The information provided by this technique may enable identifying any code or execution changes for a given application that are unexpected at runtime. The processor may maintain hashing instruction stream bytes and generate a hash when it reaches the next control flow transfer instruction (e.g., call, Jcc, jmp etc.). When the instruction pointer transfers, a new location operation may begin again. Thus, code executed between control flow transfers may produce the run-time hashes at the processor.

One benefit of the techniques related to FSM described herein is that they are both deterministic and impervious to an adversary since the directed graph may represent the actual code execution that occurred on the system. In other words, the techniques presented herein may avoid guessing or statistical approximation as required by conventional approaches.

There are many ways to use the trace data packets described herein but a directed graph may be advantageous because it is simpler to execute at real-time speed. In addition, many graph processing algorithms may be applied to a directed graph (e.g., graph similarities for malware families, graph difference for detecting new code in modified applications, etc.). Furthermore, an FSM may be uploaded into a monitor application that executes the FSM monitor given the stream of trace data packets. This allows for various capabilities, such as clustering similar applications or similar malware families to real-time monitoring of normal application behavior and detecting anomalies.

An FSM may be built using enhanced security telemetry data from the processor. This FSM approach may allow the system to detect new execution paths taken by a monitored program in real time. In particular, the system may learn the application FSM and then monitor, in real-time, for FSM compliance for the given executing application. As presented herein, during a learning phase, a program may be executed and all possible transitions learned. When the program is executed again later, these transitions may be monitored and compared against the learned information. One attractive feature of this processor trace approach is that there may also be code coverage information and a determination as to whether there are paths which have not executed. This information may be used to build confidence in violations. Also, in such a case, the SIP may be the valid address, while the TIP may be invalid or unexpected, for example.

Normal error conditions may be seen as part of typical program execution and therefore during training/learning. Conditions that are rarely exercised may be worthy of alarm by their very nature. For example, in practice, programs are rarely tested against intermittent disk failures or low memory conditions whereas other more common error cases such as credential failures are often tested. Alarming on the very rare error conditions that are not threats per-se are not likely to be problematic to a solution, since they are, by definition, rare.

In summary, the FSM may represent any compiled/complete program in terms of execution. Therefore, from a security perspective, the entire program may be represented using this FSM technique. An adversary may be unable to bypass, alter, or mask the execution as represented by the FSM.

In one form, a method is provided. The method comprises: at a computing device having a processor that executes a processor instruction stream that causes the processor to perform one or more operations for the computing device: generating one or more trace data packets that include a first instruction pointer of the processor instruction stream, a second instruction pointer of the processor instruction stream subsequent to the first instruction pointer, and a string of characters derived from instructions associated with a control flow transfer between the first instruction pointer of the processor instruction stream and the second instruction pointer of the processor instruction stream; determining whether the one or more trace data packets are consistent with a secure processor instruction stream known or determined to be secure from malicious processor instructions; and if it is determined that the one or more trace data packets are not consistent with the secure processor instruction stream, generating an indication that the processor instruction stream is not secure.

In another form, an apparatus is provided. The apparatus comprises: a network interface configured to send and/or receive data; and a processor that is coupled to the network interface and executes a processor instruction stream that causes the processor to perform one or more operations for the apparatus, wherein the processor is configured to: generate one or more trace data packets that include a first instruction pointer of the processor instruction stream, a second instruction pointer of the processor instruction stream subsequent to the first instruction pointer, and a string of characters derived from instructions associated with a control flow transfer between the first instruction pointer of the processor instruction stream and the second instruction pointer of the processor instruction stream; determine whether the one or more trace data packets are consistent with a secure processor instruction stream known or determined to be secure from malicious processor instructions; and if it is determined that the one or more trace data packets are not consistent with the secure processor instruction stream, generate an indication that the processor instruction stream is not secure.

In another form, one or more non-transitory computer readable storage media are provided. The non-transitory computer readable storage media are encoded with instructions that, when executed by a processor that executes a processor instruction stream that causes the processor to perform one or more operations for a computing device, cause the processor to: generate one or more trace data packets that include a first instruction pointer of the processor instruction stream, a second instruction pointer of the processor instruction stream subsequent to the first instruction pointer, and a string of characters derived from instructions associated with a control flow transfer between the first instruction pointer of the processor instruction stream and the second instruction pointer of the processor instruction stream; determine whether the one or more trace data packets are consistent with a secure processor instruction stream known or determined to be secure from malicious processor instructions; and if it is determined that the one or more trace data packets are not consistent with the secure processor instruction stream, generate an indication that the processor instruction stream is not secure.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A computer-implemented method performed at a computing device having a processor and processor instruction stream monitoring logic that, when executed by the processor, causes the processor to perform the computer-implemented method, the computer-implemented method comprising:
    generating a logical representation of a directed graph including a plurality of nodes and a plurality of edges, wherein the plurality of nodes respectively represent a plurality of instruction pointers in a secure processor instruction stream known or determined to be secure from malicious processor instructions, and the plurality of edges respectively represent a plurality of transitions between the plurality of nodes;
    generating one or more trace data packets that include a source instruction pointer of a processor instruction stream, a second instruction pointer of the processor instruction stream subsequent to the source instruction pointer, and a string of characters derived from instructions associated with a control flow transfer between the source instruction pointer of the processor instruction stream and the second instruction pointer of the processor instruction stream;
    determining whether the one or more trace data packets are consistent with the secure processor instruction stream by determining whether the one or more trace data packets are consistent with the directed graph; and
    if it is determined that the one or more trace data packets are not consistent with the secure processor instruction stream, generating an indication that the processor instruction stream is not secure.

2. The computer-implemented method of claim 1, wherein determining whether the one or more trace data packets are consistent with the secure processor instruction stream further includes:
    comparing the source instruction pointer of the processor instruction stream to a corresponding source instruction pointer of the secure processor instruction stream;
    comparing the second instruction pointer of the processor instruction stream to a corresponding second instruction pointer of the secure processor instruction stream; and
    comparing the string of characters derived from the instructions associated with the control flow transfer between the source instruction pointer of the processor instruction stream and the second instruction pointer of the processor instruction stream to a string of characters derived from instructions associated with a corresponding control flow transfer between the corresponding source instruction pointer of the secure processor instruction stream and the corresponding second instruction pointer of the secure processor instruction stream.

3. The computer-implemented method of claim 1, wherein determining whether the one or more trace data packets are consistent with the secure processor instruction stream further includes:
    comparing a count of occurrences of the control flow transfer between the source instruction pointer of the processor instruction stream and the second instruction pointer of the processor instruction stream to a count of occurrences of a corresponding control flow transfer between a corresponding source instruction pointer of the secure processor instruction stream and a corresponding second instruction pointer of the secure processor instruction stream.

4. The computer-implemented method of claim 1, wherein each of the plurality of transitions includes a string of characters derived from instructions associated with a respective control flow transfer between the plurality of instruction pointers of the secure processor instruction stream.

5. The computer-implemented method of claim 1, further comprising:
    identifying the plurality of instruction pointers in the secure processor instruction stream and a plurality of control flow transfers between the plurality of instruction pointers in the secure processor instruction stream as the secure processor instruction stream is executed.

6. The computer-implemented method of claim 1, further comprising:
    generating the string of characters by performing a deterministic mathematical computation on the instructions associated with the control flow transfer between the source instruction pointer of the processor instruction stream and the second instruction pointer of the processor instruction stream.

7. The computer-implemented method of claim 6, wherein the deterministic mathematical computation is a hash computation.

8. The computer-implemented method of claim 6, wherein the deterministic mathematical computation is a checksum computation.

9. An apparatus comprising:
    a memory;
    a network interface configured to send and/or receive data; and
    a processor that is coupled to the network interface and executes processor instruction stream monitoring logic that causes the processor to:
        generate a logical representation of a directed graph including a plurality of nodes and a plurality of edges, wherein the plurality of nodes respectively represent a plurality of instruction pointers in a secure processor instruction stream known or determined to be secure from malicious processor instructions, and the plurality of edges respectively represent a plurality of transitions between the plurality of nodes;

generate one or more trace data packets that include a source instruction pointer of a processor instruction stream, a second instruction pointer of the processor instruction stream subsequent to the source instruction pointer, and a string of characters derived from instructions associated with a control flow transfer between the source instruction pointer of the processor instruction stream and the second instruction pointer of the processor instruction stream;

determine whether the one or more trace data packets are consistent with the secure processor instruction stream by determining whether the one or more trace data packets are consistent with the directed graph; and if it is determined that the one or more trace data packets are not consistent with the secure processor instruction stream, generate an indication that the processor instruction stream is not secure.

10. The apparatus of claim 9, wherein the processor is further configured to:

compare the source instruction pointer of the processor instruction stream to a corresponding source instruction pointer of the secure processor instruction stream;

compare the second instruction pointer of the processor instruction stream to a corresponding second instruction pointer of the secure processor instruction stream; and compare the string of characters derived from the instructions associated with the control flow transfer between the source instruction pointer of the processor instruction stream and the second instruction pointer of the processor instruction stream to a string of characters derived from instructions associated with a corresponding control flow transfer between the corresponding source instruction pointer of the secure processor instruction stream and the corresponding second instruction pointer of the secure processor instruction stream.

11. The apparatus of claim 9, wherein the processor is further configured to:

compare a count of occurrences of the control flow transfer between the source instruction pointer of the processor instruction stream and the second instruction pointer of the processor instruction stream to a count of occurrences of a corresponding control flow transfer between a corresponding source instruction pointer of the secure processor instruction stream and a corresponding second instruction pointer of the secure processor instruction stream.

12. The apparatus of claim 9, wherein each of the plurality of transitions includes a string of characters derived from instructions associated with a respective control flow transfer between the plurality of instruction pointers of the secure processor instruction stream.

13. The apparatus of claim 9, wherein the processor is further configured to:

identify the plurality of instruction pointers in the secure processor instruction stream and a plurality of control flow transfers between the plurality of instruction pointers in the secure processor instruction stream as the secure processor instruction stream is executed.

14. The apparatus of claim 9, wherein the processor is further configured to:

generate the string of characters by performing a deterministic mathematical computation on the instructions associated with the control flow transfer between the source instruction pointer of the processor instruction stream and the second instruction pointer of the processor instruction stream.

15. The apparatus of claim 14, wherein the deterministic mathematical computation is a hash computation.

16. The apparatus of claim 14, wherein the deterministic mathematical computation is a checksum computation.

17. One or more non-transitory computer readable storage media encoded with processor instruction stream monitoring logic that, when executed by a processor causes the processor to:

generate a logical representation of a directed graph including a plurality of nodes and a plurality of edges, wherein the plurality of nodes respectively represent a plurality of instruction pointers in a secure processor instruction stream known or determined to be secure from malicious processor instructions, and the plurality of edges respectively represent a plurality of transitions between the plurality of nodes;

generate one or more trace data packets that include a source instruction pointer of a processor instruction stream, a second instruction pointer of the processor instruction stream subsequent to the source instruction pointer, and a string of characters derived from instructions associated with a control flow transfer between the source instruction pointer of the processor instruction stream and the second instruction pointer of the processor instruction stream;

determine whether the one or more trace data packets are consistent with the secure processor instruction stream by determining whether the one or more trace data packets are consistent with the directed graph; and if it is determined that the one or more trace data packets are not consistent with the secure processor instruction stream, generate an indication that the processor instruction stream is not secure.

18. The one or more non-transitory computer readable storage media of claim 17, wherein the processor instruction stream monitoring logic further causes the processor to:

compare the source instruction pointer of the processor instruction stream to a corresponding source instruction pointer of the secure processor instruction stream;

compare the second instruction pointer of the processor instruction stream to a corresponding second instruction pointer of the secure processor instruction stream; and compare the string of characters derived from the instructions associated with the control flow transfer between the source instruction pointer of the processor instruction stream and the second instruction pointer of the processor instruction stream to a string of characters derived from instructions associated with a corresponding control flow transfer between the corresponding source instruction pointer of the secure processor instruction stream and the corresponding second instruction pointer of the secure processor instruction stream.

19. The one or more non-transitory computer readable storage media of claim 17, wherein the processor instruction stream monitoring logic further causes the processor to:

compare a count of occurrences of the control flow transfer between the source instruction pointer of the processor instruction stream and the second instruction pointer of the processor instruction stream to a count of occurrences of a corresponding control flow transfer between a corresponding source instruction pointer of the secure processor instruction stream and a corresponding second instruction pointer of the secure processor instruction stream.

20. The one or more non-transitory computer readable storage media of claim 17,
wherein each of the plurality of transitions includes a string of characters derived from instructions associated with a respective control flow transfer between the plurality of instruction pointers of the secure processor instruction stream.

* * * * *